United States Patent
Baudoin et al.

(10) Patent No.: US 7,290,275 B2
(45) Date of Patent: Oct. 30, 2007

(54) SECURITY MATURITY ASSESSMENT METHOD

(75) Inventors: Claude R. Baudoin, Houston, TX (US); Colin R. Elliott, London (GB)

(73) Assignee: Schlumberger Omnes, Inc., Houston, TX (US)

( * ) Notice: Subject to any disclaimer, the term of this patent is extended or adjusted under 35 U.S.C. 154(b) by 651 days.

(21) Appl. No.: 10/134,815

(22) Filed: Apr. 29, 2002

(65) Prior Publication Data
US 2004/0010709 A1 Jan. 15, 2004

(51) Int. Cl.
*H04L 9/00* (2006.01)
*G06F 21/00* (2006.01)
(52) U.S. Cl. .......................................................... 726/1
(58) Field of Classification Search ................ 713/200, 713/201; 726/1
See application file for complete search history.

(56) References Cited

U.S. PATENT DOCUMENTS

| | | | | |
|---|---|---|---|---|
| 7,124,145 B2 * | 10/2006 | Surasinghe | ................. | 707/102 |
| 2006/0106825 A1 * | 5/2006 | Cozzi | .......................... | 707/100 |
| 2006/0112060 A1 * | 5/2006 | Weigt et al. | .................. | 706/47 |
| 2006/0184995 A1 * | 8/2006 | Backes et al. | ................. | 726/1 |
| 2007/0006190 A1 * | 1/2007 | Surasinghe | .................. | 717/143 |

OTHER PUBLICATIONS

Buren, Andre M, Information Security at Top Level, IFIP congress, 1999.*
CERIAS and Anderson Consulting, Policy Framework for Interpreting Risk in eCommerce Security, CERIAS Tech Report 2000-01, no date provided.*
COBRA, ISO17799/BS7799 Security Consultant, http://web.archive.org/web/20010420021331/http://www.securitypolicy.co.uk/secconsu.htm, no date provided.*
COBRA, COBRA Release 3: The Next Step, http://web.archive.org/web/20010303012331/www.securitypolicy.co.uk/rel3.htm, no date provided.*

(Continued)

*Primary Examiner*—Christopher Revak
(74) *Attorney, Agent, or Firm*—Osha Liang LLP

(57) ABSTRACT

A method for assessing an information security policy and practice of an organization, including determining a risk associated with the information security policy and practice, collecting information about the information security policy and practice, generating a rating using a security maturity assessment matrix, the collected information, and the risk associated with the information security policy and practice, generating a list of corrective actions using the rating, executing the list of corrective actions to create a new security information policy and practice, and monitoring the new security information policy and practice.

35 Claims, 4 Drawing Sheets

OTHER PUBLICATIONS

Allard, JL, System Security Engineering-Capability Maturity Model, ISACA Round Table Oct. 20, 2001, http://www.isaca.be.*

"Security Risk Analysis, ISO 17799 (or BS7799), Security Policies and Security Audit Solutions;" copyright 1993-2001, Matrix0 Web Services, 3 pages; http://www.securityauditor.net.

"What is: ISO 17799?", copyright 2000-2001 Security Risk Associates, 2 pages; http://www.securityauditor.net/iso17799/what.htm.

"COBRA Risk Consultant," copyright 2001, C&A Security Risk Analysis Group; 2 pages; http://www.security-risk-analysis.com/riskcon.htm.

"COBRA Knowledge Bases," copyright 2001 C&A Security Risk Analysis Group; 5 pages; http://www.security-risk-analysis.com/cobkbs.htm.

Systems Security Engineering Capability Maturity Model ("SSECMM"); Model & Appraisal Method Summary; Apr. 1999; pp. 1-24; International Systems Security Engineering Association; www.issea.org.

Mark C. Paulk et al.; "Capability Maturity Model for Software, Version 1.1"; Technical Report, CMU/SEI-93-TR-024, ESC, TR-93-177, Software Engineering Institute, Carnegie Mellon University, Pittsburgh, PA; Feb. 1993; 82 pages.

* cited by examiner

SECURITY MATURITY ASSESSMENT METHOD

BACKGROUND OF INVENTION

Information Security encompasses the protection of information against unauthorized disclosure, transfer, modification, or destruction, whether accidental or intentional. Information security has become a prevalent concern of organizations as a result of the trends towards e-commerce, e-business, universal email and web access, and well-publicized security exploits. As a result, organizations are attempting to apply information security principles in a pragmatic framework.

To enable organizations to apply information security principles in a pragmatic framework, a number of information standards and tools have been developed. One widely recognized standard, BS7799/ISO17799, was developed by the British Standards Institution (BSI) and adopted by the International Organization for Standardization (ISO). The BS7799/ISO17799 standard is a comprehensive set of controls that outline best mode practices in information security. The aim of BS7799/ISO17799 is to serve as a single reference point to determine the appropriate information security policy for a variety of systems and organizations. The BS7799/ISO17799 standard includes 10 sections, each addressing a specific area of information security. See, "ISO17799 Security Standard: ISO 17799 Compliance & Positioning."

The process of managing compliance with the BS7799/ISO17799 is a non-trivial task. As a result, a number of risk analysis and risk management products have been developed to help organizations comply with the BS7799/ISO017799 standard. One such product is COBRA, which was developed by C & A Systems, Inc. COBRA is used to semi-automate the assessment process. COBRA utilizes a series of online questionnaires to obtain information about the current security policy. Using the answers from the questionnaires, COBRA creates reports that provide information about the organization's current compliance position, on a pass/fail basis, with respect to each section of the BS7799/ISO17799 standard.

Another tool that has been developed to enable organizations to apply information security principles in a pragmatic framework is the Systems Security Engineering Capability Maturity Model (SSE-CMM). The SSE-CMM is derived from concepts of the Software Engineering Institute (SEI) Capability Maturity Model initially created for software development. The SSE-CMM describes the essential characteristics of an organization's security engineering process that must exist to ensure good security engineering. The SSE-CMM does not prescribe a process or standard such as BS7799/ISO17799, but rather uses a model that captures practices generally observed in the industry. Additionally, the SSE-CMM is based on a maturity model that defines specific goals and practices for the entire life cycle of an organization. Further, the SSE-CMM defines an overall assessment process and roles for security engineering within an organization. See, "System Security Engineering Capability Maturity Model-Model & Appraisal Method Summary April 1999." The resulting assessment obtained from applying the SSE-CCM is typically not associated with a reporting tool to report the maturity level.

SUMMARY OF INVENTION

In general, in one aspect, the invention relates to a method for assessing an information security policy and practice of an organization, comprising determining a risk associated with the information security policy and practice, collecting information about the information security policy and practice, generating a rating using a security maturity assessment matrix, the collected information, and the risk associated with the information security policy and practice, generating a list of corrective actions using the rating, executing the list of corrective actions to create a new security information policy and practice, and monitoring the new security information policy and practice.

In general, in one aspect, the invention relates to an apparatus for assessing an information security policy and practice of an organization, comprising means for determining a risk associated with the information security policy and practice, means for collecting information about the information security policy and practice, means for generating a rating using a security maturity assessment matrix, the collected information, and the risk associated with the information security policy and practice, means for generating a list of corrective actions using the rating, means for executing the list of corrective actions to create a new security information policy, and means for monitoring the new security information policy.

In general, in one aspect, the invention relates to a computer system for assessing an information security policy and practice of an organization, comprising a processor, a memory, an input means, and software instructions stored in the memory for enabling the computer system under control of the processor, to perform determining a risk associated with the information security policy and practice, collecting information about the information security policy and practice using the input means, generating a rating using a security maturity assessment matrix, the collected information, and the risk associated with the information security policy and practice, generating a list of corrective actions using the rating, executing the list of corrective actions to create a new security information policy and practice, and monitoring the new security information policy and practice.

Other aspects and advantages of the invention will be apparent from the following description and the appended claims.

DETAILED DESCRIPTION

Figure 1:
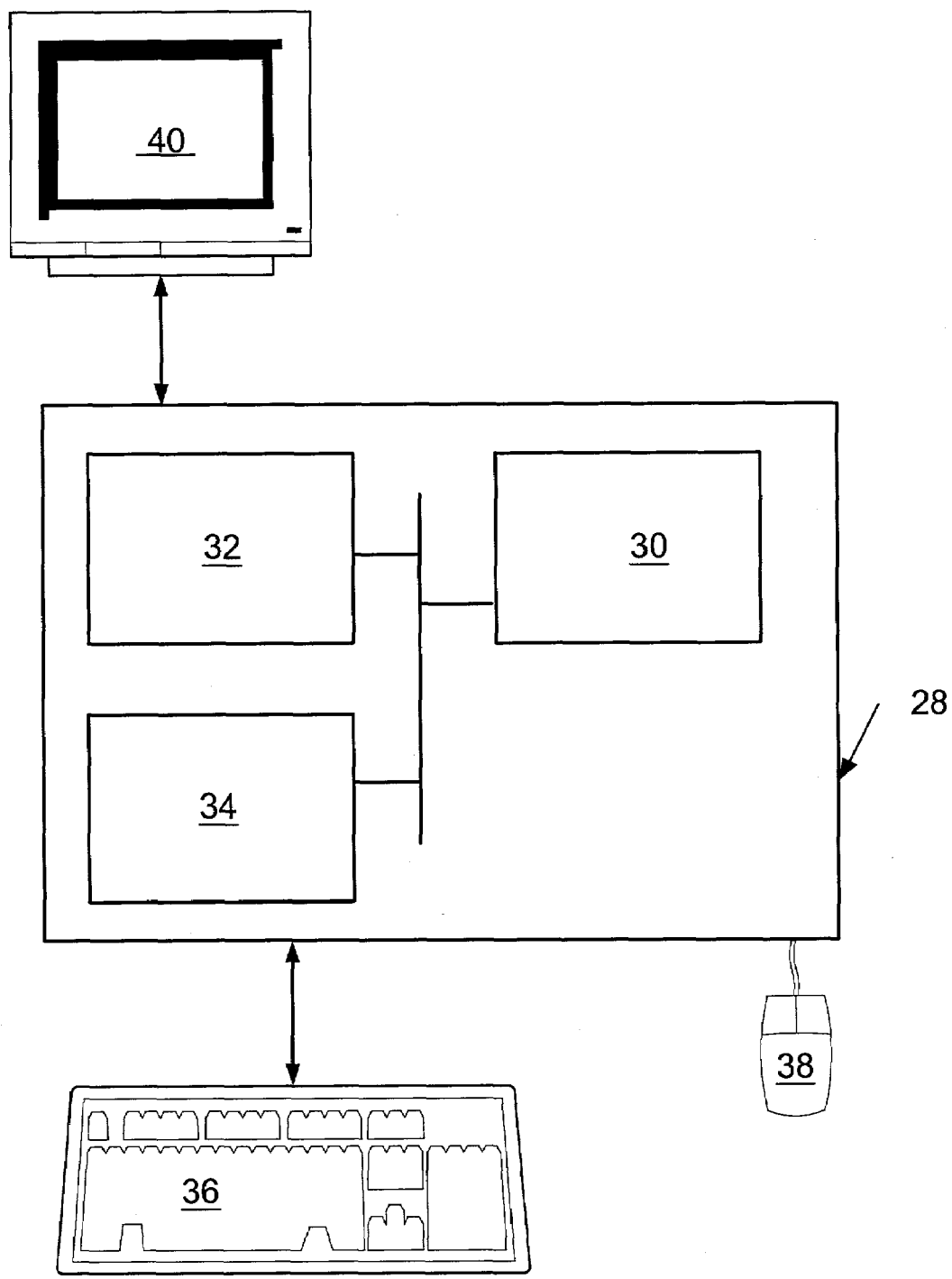
FIG. 1 illustrates a typical computer system.

Exemplary embodiments of the invention will be described with reference to the accompanying drawings. Like items are denoted by like reference numerals throughout the drawings for consistency.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The invention relates to a method for assessing a security maturity of an organization. Further, the invention relates to assessing the security maturity of an organization using a security assessment matrix. Further, the invention relates to basing the security assessment matrix on the BS7799/ISO17799 standard and the Capability Maturity Model (CMM). Further, the invention relates to a method for providing quantitative, action-oriented results using the security assessment matrix. Further, the invention relates to a method to compare the security maturity of an organization to a pre-determined goal, or to the security maturity of the same organization at another point in time, or to the security maturity level mandated by another organization or authority.

The invention may be implemented on virtually any type computer regardless of the platform being used. For example, as shown in FIG. 1, a typical computer (28) includes a processor (30), associated memory (32), a storage device (34), and numerous other elements and functionalities typical of today's computers (not shown). The computer (28) may also include input means, such as a keyboard (36) and a mouse (38), and output means, such as a monitor (40). Those skilled in the art will appreciate that these input and output means may take other forms in an accessible environment.

The Security Maturity Assessment (SMA) method involves five distinct stages: (1) management awareness and commitment, (2) security maturity assessment, (3) corrective action plan (CAP), (4) corrective action plan execution (CAPE), and (5) ongoing monitoring. Each of the aforementioned stages is explained below in greater detail. Those skilled in the art will appreciate that the names used to denote the stages may vary without detracting from the invention.

Figure 2:
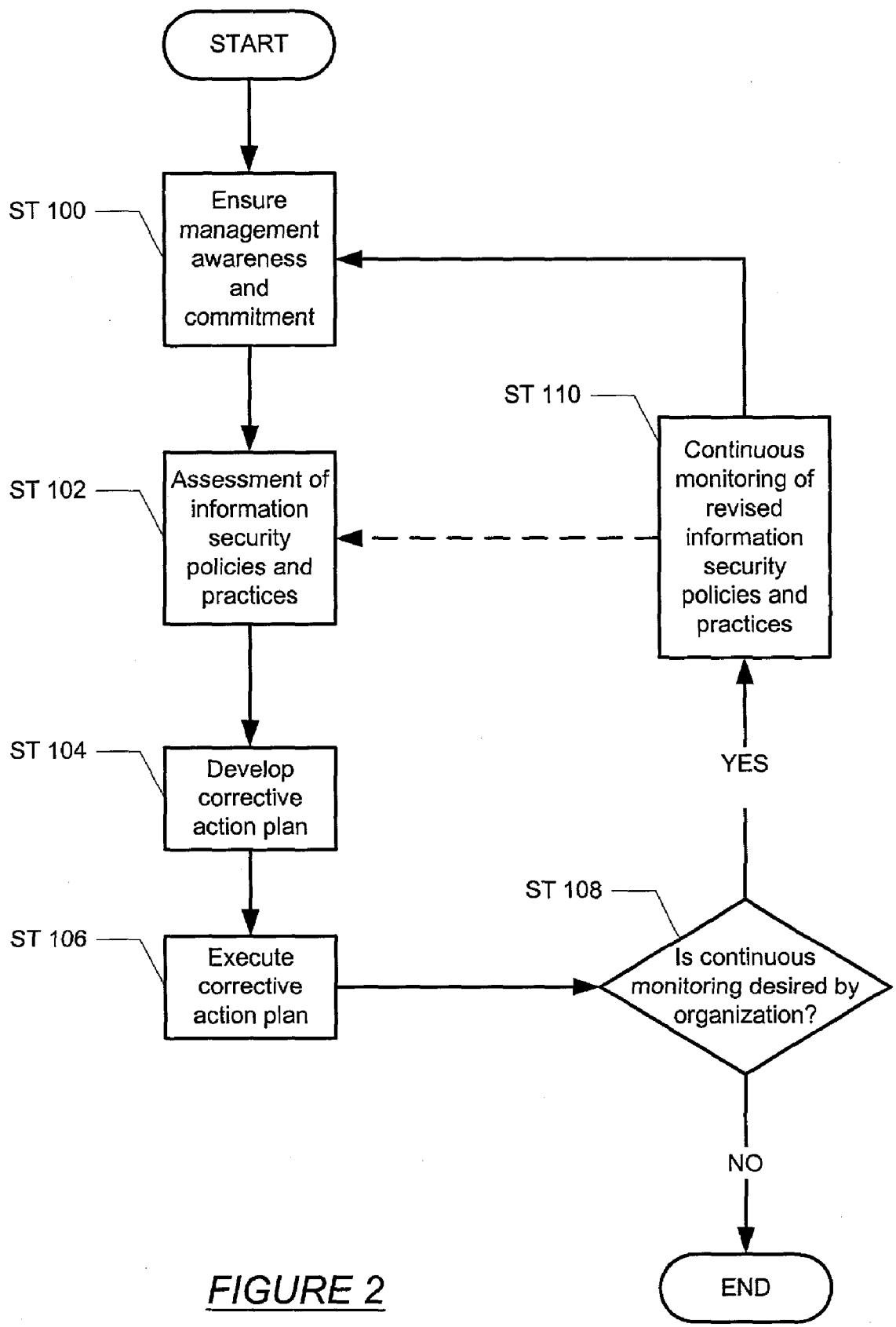
FIG. 2 illustrates a flowchart detailing the Security Maturity Assessment method in accordance with one embodiment of the invention.

FIG. 2 illustrates a flowchart detailing the SMA method in accordance with one embodiment of the invention. The SMA method is initiated by ensuring that an organization's management is aware and committed to improving the organization's information security practices and policies (Step 100). An assessment entity (e.g., individual/company conducting assessment) then assesses the organization's information security practices and policies (Step 102). Using the information gained in Step 102, the assessment entity develops a corrective action plan (Step 104). The corrective action plan is subsequently executed (Step 106). If the organization desires continuous monitoring after the execution of the corrective action plan (Step 108), then the assessment entity may continuously monitor revised information security policies and practices of the organization (Step 110). Following the continuous monitoring, the method may return to Step 100 to ensure that the organization's management is still aware and committed, or potentially proceed directly to Step 102 if the organization's management continues to be aware and committed. If the organization desires not to have continuous monitoring after the execution of the corrective action plan (Step 108), then the method ends.

The management awareness and commitment stage is the first stage of the SMA method and is used to raise awareness within the management of the organization being assessed and to initiate gathering of information. Specifically, in the management awareness and commitment stage, an assessment entity gathers information to understand the organization's business goals. Further, the assessment entity gathers information to understand the associated risks in terms of information security. For example, if the organization is using a wireless Local Area Network (LAN), there are different information security risks to consider than if the organization is using a conventional LAN where all computers are connected via Ethernet cable. Additionally, the assessment entity creates awareness in the organization by presenting the security maturity assessment methodology and method. In one or more embodiments of the invention, the assessment entity may also provide additional information about the underlying standards, e.g., the ISO standard. In one or more embodiments of the invention, the assessment entity may also provide an explanation of the concept of a maturity model as it applies to the security assessment.

The security maturity assessment stage is initiated by the assessment entity identifying participants required to perform the SMA. Additionally, the assessment entity, in conjunction with the organization, determines the effect and cost to be used to perform the SMA. A time line is also set to allow the assessment entity and the organization to have a means to track the progress of the SMA. At this point, in one or more embodiments of the invention, the assessment entity may request that the organization sign an assessment contract to ensure commitment by the organization to follow through with the SMA. Once the aforementioned steps have been completed, the assessment entity proceeds to perform the SMA.

The assessment entity initiates the SMA by collecting documents detailing the organization's existing information security policies and practices. After review of the collected documents, additional information is typically obtained via interviews with participants identified at the beginning of this stage. Using the information obtained from the collected documents and the interviews, a preliminary rating is generated. The preliminary rating details the maturity of individual sections and the overall maturity level of the organization's information security practices and policies.

In one or more embodiments of the invention, the preliminary rating is generated using a security assessment matrix (SAM). The SAM defines each level of maturity for each information security item. The SAM includes 61 rows corresponding to the groups of the BS7799/ISO17799 standard information security items, and 5 columns defining the maturity level. The five maturity levels, arranged from least mature to most mature, are Initial (Level 1), Repeatable (Level 2), Defined (Level 3), Managed (Level 4), and Optimizing (Level 5). For each intersection of row and column, there is a paragraph that defines a specific "capability maturity" level. The paragraphs contained in a given row of the SAM represent successive capability maturity levels for the same information security item. Further, some rows of the SAM represent successive capability maturity levels associated with a single information security item, as described in one paragraph of the BS7799/ISO17799 standard. Other rows of the SAM may represent successive capability maturity levels of information security items that the BS7799/ISO17799 standard describes in separate paragraphs or sections.

In one or more embodiments of the invention, an item definition for each information security item is included in the SAM. The item definition acts as a legend for the level definitions for a particular information security item. Further, in one or more embodiments of the invention, the SAM includes level definitions as follows: Level 1—Initial; Level 2—Not written down, but communicated via coaching;

Level 3—Written down; Level 4—Responsibility is defined; Level 5—Process exists for catching deviations and improving the information security to prevent them. Further, in one or more embodiments of the invention, the SAM includes scope requirements. The scope requirements indicate to which various aspect of an organization's operations the criteria set forth in a particular row of the SAM must be applied.

The combination of a certain level definition (e.g., Level 1) with one information security item (i.e., a specific row of the SAM) yields a specific criterion that one skilled in the art can apply to establish if the organization being assessed meets, fails or exceeds this level of maturity for this information security item. Furthermore, those skilled in the art can apply the general definition of the maturity level (Level 1 through 5) to a specific information security item in such a way that they can readily determine whether the organization being assessed meets, fails or exceeds this level of maturity for this security item, even if the specific criterion set forth at the intersection of this row and column of the SAM is, for any reason, not directly applicable in the case of this organization.

Table 1 illustrates the SAM in accordance with one or more embodiments of the invention:

TABLE 1

Security Assessment Matrix

| ISO 17799 Categories | Item Definitions | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements | Scope Requirements |
|---|---|---|---|---|---|---|---|
| III.1 Information Security Policy | Coverage of Security Policy Review of effective implementation of information security policy Review of Information Security Policy | No security policy in place | Security policy exists, but as a general statement. Inferring what is specifically mandated or prohibited requires consulting specialized personnel. No regular reviews. | Specific policy exists, clearly stating in detail what is mandated or prohibited. A "normal" person can easily understand it. Reviews carried out at intervals, but no clear management responsibility to trigger reviews or exploit results | Security policy covers all areas of business. Security policy is owned by appropriate functions including IT but also Finance, HR, Legal, etc. Organization policies define the roles and responsibilities in following procedures. Reviews carried out - intervals and responsibility for the reviews are defined explicitly in the policy. | Clear responsibilities and mechanisms in place to upgrade policy if required after every breach of policy, also if business changes (acquisition, divestiture, or major changes in process such as outsourcing) occur. | Goal and principle of every information security Information sharing management and responsibilities |
| | Availability of Security Policy to Employees Security Education and Technical Training | No security policy communication to employees (non-existent, or limited to IT personnel). | Security policy is discussed with employees and contract or temporary personnel upon hiring. | There is a Security Policy manual, mentioned on public notice board and/or on web page. | Security policy communication is part of written IT and Personnel procedures. Training and/or communication on security policy occur at least once a year. | Each security incident is subject to a post mortem procedure that includes a review of whether applicable policies were correctly communicated. Users are taught the incident reporting procedures. | Staff awareness and education Responsibilities and emergency arrangements Well defined policy Security training integrated into personnel development program Management responsibility to provide security training, including the specification of a clear desk and clear screen policy for all employees. |
| | Review of Security Process | Issued once, never reviewed | Occasionally reviewed if senior management, auditors, etc., ask | Reviewed at intervals, but no clear management responsibility to trigger reviews of exploit results | A clearly designated person or body has responsibility for the process, and reviews it regularly. | There is a defined mechanism to review and upgrade the policy after every security incident (is anything missing from the policy that could | General management responsibility |

TABLE 1-continued

Security Assessment Matrix

| | ISO 17799 Categories | Item Definitions | Level 1 (Initial) | Level 2 (Repeatable) Not written down, but communicated via coaching | Level 3 (Defined) Written down | Level 4 (Managed) | Level 5 (Optimizing) Process exists for catching deviations and making constant improvements | Scope Requirements |
|---|---|---|---|---|---|---|---|---|
| IV.1 | Information Security Infrastructure | Responsibility for the protection of individual assets | No responsibility is assigned. | Specific individuals are aware of their responsibility to protect some assets. The list of assigned responsibilities is not documented. | A matrix for the responsibility of protection of assets exists and is published. | Responsibility is defined. A specific party is responsible for defining and maintaining the responsibility matrix for the protection of individual assets. Successive versions of the matrix are archived to help in future investigations. | have prevented the problem?) Security responsibility is a required field in the asset management process, so rows in the matrix are created when new assets are acquired. Assets without a responsible party is immediately flagged for corrective action. | Individual assets refer to the organization's physical assets (e.g., computers, printers, media, etc.) |
| | | Security in job definition and resourcing | No formally defined process. | Specific individuals are aware of their responsibility. | Responsibility for security decision making has been assigned and documented. | A specific party is responsible for developing job responsibilities, personnel screening and confidentiality agreements. | Job descriptions and personnel screening arrangements are periodically reviewed to conform to the changing security needs of the business. Also personnel are required to sign and agree to confidentiality agreements. | Interpretation is based on SSO/IRT type position. |
| | | Information security education and training | No formally defined training plan | Key members of personnel are trained on an ad-hoc basis. | Training for personnel is defined and performed periodically. | A specific party is responsible for defining the training plan developing training schedules for all personnel | Security curriculum is periodically reviewed to conform to the changing needs of the business. Training records are reviewed against policy and exceptions lead to training program updates. | |
| | | Approval process for the acquisition and installation of IT facilities. | No approval process exists. | Informal, undocumented knowledge of steps to be followed when acquiring or | A clear approval process is defined for the acquisition | A specific party is responsible for defining and maintaining the approval process for IT facility | The approval process is periodically reviewed to conform to the changing needs | |

TABLE 1-continued

Security Assessment Matrix

| | | | Level Definitions | | | | |
|---|---|---|---|---|---|---|---|
| ISO 17799 Categories | Item Definitions | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements | Scope Requirements |
| | | | installing IT facilities exists. | and installation of IT facilities and published across the enterprise. | acquisition and installation. | of the business. The approval process for each acquisition and installation of IT facilities is reviewed for accuracy and corrective action is taken where appropriate. | |
| IV.2 | Security Control of Third Party Access to Information Processing Facilities | No control mechanism | Physical access control allows ad hoc decisions by IT staff who have been told informally what to do. | The access control rules are documented. There is a formal contract with each party that requires access. | Third-party access is linked to the rest of the organization's security system through the issuance of access tokens, and accesses are logged. | The access logs and the list of authorized third parties is regularly audited and changes to procedures is made when the need arises. | |
| IV.3 | Security Controls for External Contractors | None; contractors are handled by task owner without specific policies or procedures. | IT, Security, Legal, or Purchasing apply some regular steps when a contract is issued. These steps are not specifically documented. | The procedures for contractor security are documented in writing and personnel and managers have access to them and are aware of their contents. | There is a registry of contractors. They sign the security policy, NODE and IP agreements. Audits are run at least quarterly to make sure the list of contractors is current. The owner of the process is defined. | Procedures are reviewed on at least an annual basis for possible improvements. | Critical applications stay in house Approval of business owners. Implications for business continuity plans. Security standards and compliance Security incident procedures. |
| V.1 | Coverage of Asset Inventory Maintenance | No inventory | Manual inventory, occasional, on demand. | Inventory performed according to written procedures, but schedule and triggering | Schedule, triggers, roles and responsibly, are defined. Ownership is clear and known throughout the IT | There is a process to review what happened after each inventory. Inventories are incremental, not from scratch | Information Asset Inventory Software Asset Inventory Physical |

TABLE 1-continued

Security Assessment Matrix

| ISO 17799 Categories | Item Definitions | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements | Scope Requirements |
|---|---|---|---|---|---|---|---|
| | | | | events are not well defined. Typically not automated. | organization and management. | every time. Asset inventories are automated. | Asset Inventory Services Inventory Printed Reports Screen Displays Magnetic Media Electronic Messages File Transfers |
| | Ease of Alteration of Information Assets | Information assets can be altered without control | There is informal knowledge that classified documents cannot be altered at will, but no systematic procedures. | There is a documented change procedure that applies to all classified information assets. No systematic control mechanisms in place. | There are control mechanisms (e.g., access controls) to prevent alteration without proper authorization. | There is a mechanism in place to review the effectiveness of the change control process and detect the need for improvements. | |
| | Coverage of Information Handling Procedures | No procedures in place for handling information. | Covers some information assets. Little formality. No regular reviews. Applied by few business units. | There is an Information Handling manual, mentioned on the public web page, and covering essentially all types of assets and all business units. | Information handling procedures are owned by appropriate functions including IT but also Finance, HR, Legal, etc. Organization policies define the roles and responsibilities in following procedures. | Information handling training is part of written IT and Personnel procedures. Processes in place to report and learn from cases when information has been handled incorrectly. | Information Asset Inventory Software Asset Inventory Physical Asset Inventory Services Inventory Printed Reports Screen Displays Magnetic Media Electronic Messages File Transfers ("Handling" = copying, storage, electronic transmission, |

TABLE 1-continued

Security Assessment Matrix

| | ISO 17799 Categories | Item Definitions | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements | Scope Requirements |
|---|---|---|---|---|---|---|---|---|
| | | | | | | | | spoken transmission, destruction) Printed Reports Engineering files (photos, microfiche, etc.) Screen Displays Magnetic Media Electronic Messages File Transfers |
| V.2 | Information Classification | Classification of Information Assets Labeling of Information Assets | No classification | Ad hoc classification, at document owner's initiative. Most documents not marked. If marked, labels are inconsistent. No systematic awareness campaign. | Information asset classification is published and "pushed" to all potential document owners. It covers security. Classified information is labeled, consistently. | Ownership of the classification is clearly defined as part of company procedures and is known of management. | Security classification is reviewed periodically. List of documents with highest classification is reviewed periodically. Declassification procedures exist. | |
| VI.1 | Security in Job Definition and Resourcing | Screening of new applicants. Complete checking of the new applicant's CV. Screening of contractor and temporary staff | Incomplete or a lack of screening of applicants. Contractor hiring are not vetted through HR. | Screening of applicants is performed informally, is not documented, and is not performed consistently. | Documented and published procedures for applicant screening exist and are used by the organization. | A specific party is responsible for defining and maintaining the screening procedure. Results of the screening are captured in the applicant's HR file. | Procedures are reviewed regularly for improvements and compliance. Security issues found to be related to failings in the screening procedure mandate immediate review and update of the procedure. | Applicant refers to all employees (contractor, permanent, or part time) |
| VI.2 | User Training | Security awareness of personnel | Little awareness of corporate security. | Discussed with employees and contract or temporary personnel upon hiring. | Documented in writing and made available to all staff. Employees receive a copy of security policy on hiring and are required to acknowledge receipt. | Roles and responsibilities to maintain and communicate the security policy are defined. Acknowledgement of the policy is tracked and stored as part of the HR policy of the | Audits of the security acknowledgments are performed. A system of re-acknowledgment occurs periodically and upon changes to the security policy. Incidents are analyzed for performance | |

TABLE 1-continued

Security Assessment Matrix

| ISO 17799 Categories | Item Definitions | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements improvement to the security awareness procedures. | Scope Requirements |
|---|---|---|---|---|---|---|---|
| | Security education and technical training | No education or training is provided. | Security education and technical training are not provided consistently and the responsibility is at the discretion of management. | Security education is documented and included as part of the hiring process. Technical training roadmaps exist for each employee. | employee. A specific party is responsible for defining and maintaining the security education and technical training program. Training records are captured in the employee's file. Review and planning for future training is part of the appraisal process. | Training plans are periodically reviewed to conform to the changing needs of the business. Training records are reviewed against policy and exceptions lead to corrective actions. | |
| VI.3 Responding to Security Incidents and Malfunctions | Disciplinary Process for Company Security Violation | None documented. Reaction is ad hoc. | Managers have intuitive awareness of need, can quote multiple levels of penalty, including but not limited to firing. Managers and HR independently agree on how to initiate and conduct disciplinary actions. | The definition of violations, investigation process, and list of applicable penalties is documented, distributed, signed by the appropriate parties, and personnel has been educated as to the content. | The documented process includes roles and responsibilities for each step, and a clear workflow. | After each incident that causes the procedure to be invoked, the process is reviewed and, when applicable, the process is revised (including the training or the penalty clauses). | |
| VII.1 Secure Areas | Protection from unauthorized access. Physical entry control to office, room. | The IT equipment is left unattended with no controls beyond physical | Access control is provided on an ad hoc basis typically by IT manager. No defined list of access rights is published or | List of secure perimeters and access rights to those areas are documented and published. | All access to secure IT areas is performed by a mechanism (e.g., badge access control system) that allows for personal identification and | Auditing of access control system logs is done periodically. Changes in facilities and management trigger a review and revision of the access procedures. | |

TABLE 1-continued

Security Assessment Matrix

| ISO 17799 Categories | Item Definitions | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements | Scope Requirements |
|---|---|---|---|---|---|---|---|
| | Physical security for IT facilities. | building access. | managed. | | auditing. Access control is managed centrally for granting and revoking rights and is linked to hiring and termination policies. | | |
| VII.2 Equipment Security | Fire alarm system in not present. | The fire alarm system exists and people have been informally made aware of the system. | Procedures for the fire alarm system are visible and posted, including evacuation path, behavioral actions, Halon warnings, etc. | The fire alarm system is tested. Procedures exist for evaluation of the fire alarm system including damage assessment and recovery, evacuation headcount, etc. | Reaction to actual alarms is reviewed and improvements implemented into the current system and alternative systems reviewed where necessary. | | |
| | Personal workstation policy | No policies for personal workstations exist. | Policies for personal workstations exist but are not published or adopted fully across the organization. | There is a documented policy for personal workstations and steps are taken to spread its awareness among employees. | A specific party is responsible for defining and maintaining the personal workstation policy. Sensitive information is protected by means of encryption. | The personal workstation policy is regularly reviewed to ensure it conforms to the changing needs of the business. Personal workstation needs are reviewed and changes are made where necessary. Audits are carried out to ensure that the organization maintains a recognized workstation policy to ensure efficient management. | |
| | Protection from environmental threats and hazards. Protection | There are no procedures in place to protect from safety threats or hazards. | There is an informal safety threat protection policy in place. This is not enforced | There is a formal documented policy in place. It details all the steps that need to be followed to | A specific party is responsible for defining and maintaining the safety threat control guidelines. | The safety threat policy is regularly reviewed to ensure it conforms with the changing needs of the business. The policy is regularly | |

TABLE 1-continued

Security Assessment Matrix

| ISO 17799 Categories | Item Definitions | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements | Scope Requirements |
|---|---|---|---|---|---|---|---|
| | from human carelessness (eating, smoking, drinking). Protection from power and communication cabling from interception or damage. | | throughout the organization and the details of the policy are not documented. | protect from potential hazards. | | reviewed and changes are made where necessary to ensure continued compliance. | |
| VII.3 General Controls | Inspection of incoming goods for hazards | Incoming goods are not inspected. | There is no formal process to inspect incoming goods. It is carried out in an adhoc manner. | There is a documented process whereby all incoming goods are inspected per a defined plan. | A responsible party is identified to manage the processes and procedures for inspecting incoming goods for safety compliance. | The key goods screening process is regularly reviewed to ensure they conform to the changing needs of the business. Goods screening needs are reviewed and changes are made where necessary. The organization maintains historical files of incoming goods; these are regularly reviewed to ensure that there are no discrepancies. | |
| | Process of removal of organization's property | There is no standardized procedure for removal of property. | An informal process exists for property removal. | A formal process is documented and published the to organization for property removal. | An inventory of organizational property is maintained and updated regularly. A group or individual is identified to verify that the process is followed. | Audits of the organization's property are carried out periodically and changes to the removal process are made where necessary. | |
| | Equipment maintenance | There are no equipment | Equipment maintenance is | Equipment is covered by | A responsible party is identified | Record of equipment maintenance is | |

TABLE 1-continued

Security Assessment Matrix

| ISO 17799 Categories | Item Definitions | Level Definitions | | | | | Scope Requirements |
|---|---|---|---|---|---|---|---|
| | | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements | |
| | | maintenance policies and the equipment maintenance is done only on failure. | carried out on an ad hoc basis based on manufacturer recommended service intervals | insurance and the equipment maintenance controls the determination of risk. | to oversee equipment maintenance policies are followed. | examined to determine fault patterns or abuses. Appropriate changes are incorporated into the maintenance policies. | |
| | Sensitive data disposal procedure | Data disposal procedure is not defined. | Data disposal procedure is informally defined. | Data disposal procedure is formally defined and published to the organization. | A responsible party is identified to oversee that the disposal procedure is followed. | The disposal procedure is audited regularly and appropriate steps incorporated into the procedure. | |
| VIII.1 Operational Procedures and Responsibilities | Management Responsibilities and Procedures Incident Reporting Procedures | None - each incident is handled ad hoc on a best effort basis. | Common awareness of procedures. Effort for repeatability includes staff meetings, training sessions, coaching | Documented in writing and made available to all IT staff (and other department staff with IT roles) | Roles and responsibilities are defined. Escalation and reporting chains exist. Issues and requests are recorded as trouble tickets. | Procedures include a mechanism to evolve them. Incidents are analyzed to suggest improvements. There is a quality improvement process, documented and applied. | Reporting procedures cover: All types of security incident Contingency plans Audit trails and similar |
| VIII.2 System Planning and Acceptance | Testing of new information systems requirements and upgrades prior to deployment | None; new systems are placed in operation without any formal test procedure. | Testing is informal and is performed based on individuals' knowledge, not on a formal process. | A formal document defining the testing and deployment of new and upgraded systems is defined. | The responsibility to define, review, and ensure compliance with the testing policy is defined. There are system level tools that prevent unauthorized changes to production systems. Documents exist detailing interfaces into the change management process. | Policy is periodically reviewed and revised upon any change in the production systems or organizational structure. Testing methodology and tools are continuously examined to determine applicability to the organization and then introduced. | Recover actions and authority Includes issues of capacity planning and Systems Acceptance. Issues to be considered include: Performance and Computer Capacity Requirements Error Recovery and Restart Procedures Security Controls/Issues Manual |

TABLE 1-continued

Security Assessment Matrix

| ISO 17799 Categories | Item Definitions | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements | Scope Requirements |
|---|---|---|---|---|---|---|---|
| | | | | | | | Processes Business Continuity Arrangements Additional Load on existing machines Training in the operation of the new equipment |
| VIII.3 Protection Against Malicious Software | Detection and protection against malicious software. User awareness of procedures to deal with malicious software Procedures for reporting and recovery from virus attacks | No detection, protection measures, reporting, or recovery procedures exist, and dealing with malicious software and virus attacks is entirely reactive and handled in an ad hoc manner. | IT staff has informally defined procedures for detecting and handling malicious software and virus attacks. There are no common tools, formal documentation, or training programs for all employees. | A formal, documented procedure for detecting and handling malicious software and virus attacks exists and is communicated to all employees as part of the corporate security policy. A standard set of protective security tools is defined and deployed. Training is given to all employees. | A specific party is responsible for defining and maintaining the detection and protection procedures, informing and training the users, managing the detection and recovery efforts, and selecting and maintaining the protective tools. | The procedure includes a mechanism for evolution. Incidents are analyzed to suggest improvements. The toolset is continuously examined and updated to provide maximum protection against changing treats. | Procedures cover: All types of virus and malicious software incident Contingency plans Audit trails and similar Recover actions and authority |
| | Policy relating to licensed software and prohibition of unauthorized software | No policy or monitoring exists regarding software installation | Software monitoring policies are informal and performed on an ad hoc basis. The IT organization, when involved in software procurement, applies controls informally. | A software licensing policy is documented and published to all employees. | A specific party is responsible for monitoring and maintaining authorized software licenses for the enterprise. A software inventory licensing tool is used to monitor and ensure compliance. | List of authorized software is periodically reviewed to conform to the changing needs of the business. Software audits are reviewed and exceptions lead to corrective actions. | |

TABLE 1-continued

Security Assessment Matrix

| | ISO 17799 Categories | Item Definitions | Level 1 (Initial) | Level 2 (Repeatable) Not written down, but communicated via coaching | Level 3 (Defined) Written down | Level 4 (Managed) | Level 5 (Optimizing) | Scope Requirements |
|---|---|---|---|---|---|---|---|---|
| VIII.4 | Housekeeping | Monitoring of processing power and storage to ensure availability | No monitoring exists. Capacity adjustments are performed in reaction to problems. | Informal monitoring as part of system management procedures performed on an as needed basis. No management capacity plan or model is specifically defined. | Capacity plan and capacity management process covering processing power, memory, disc space, LAN/WAN capacity, backup capacity, number of user workstations, physical space and power. | Ownership of the capacity plan and capacity management process is defined. Formal mechanism for business managers to place requirements into the plan and a link exists between the capacity planning process and the budgeting process. | New technology, contractual agreements, and supplier selection are continuously researched and introduced into the environment in order to provide the necessary resources while optimizing the costs. | Process exists for catching deviations and making constant improvements |
| VIII.5 | Network Management | Covered by other questions in this section | | | | | | |
| VIII.6 | Media Handling and Security | Procedures and controls to protect computer media | No procedures or controls are in place to protect computer media. | IT staff has informally defined procedures and controls for protecting computer media. There is no formal documentation, access logs, or training programs for all employees. | Formal, documented procedures for protecting computer media exist and are communicated to all employees as part of the corporate security policy. Controls are in place to limit and track access to media. Training is given to all employees. | A specific party is responsible for defining and maintaining the procedures for the access control systems and auditing of access to computer media. | Procedures are periodically reviewed to address changes in the type or volume of computer media to be handled. Audit logs are reviewed and exceptions lead to corrective action. | Media includes: IT computer room media (e.g., backup tapes, removable hard drives, CD-ROMs, etc.) User media (e.g., CD-ROMs, floppy discs, etc.) |
| VIII.7 | Exchanges of Information and Software | Security of exchange of data and software with other organizations. | No defined procedures to secure the exchange of data or software. | No corporate standard or policy exists addressing securing the exchange of data and software with other organizations. | A corporate standard for the security exchange of data and software with other organizations is documented and | A specific party is responsible for defining and maintaining the standards for the secure exchange of data and software. An | The standards are periodically reviewed to address changes to the data being exchanged or the means of exchanging. The information | Standards for secure exchange of data and software with 3rd parties and outsourcing vendors. |

TABLE 1-continued

Security Assessment Matrix

| | ISO 17799 Categories | Item Definitions | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements | Scope Requirements |
|---|---|---|---|---|---|---|---|---|
| | | | | | published to all employees. | information classification policy determines what can be and how it is transmitted. | classification policy continually evolves. | Information classification policy |
| IX.1 | Business Requirements for Access Control | Documentation of business requirements for access control. Access policy statement defining the access right of each user or group of users. Protection of connected services from unauthorized use. Review of user access right and capabilities Policy concerning the use of network and network services. Network controls in place | No awareness or practice of access control. | An informal, undocumented access control practice is applied on an ad hoc basis. | An access policy statement defining access rights of each user or group of users exists and is published. | A specific party is responsible for defining and maintaining the access policy statement and ensuring it is in alignment with business requirements. | The access policy statement is periodically reviewed to conform to the changing needs of the business. Security incidents are reviewed and modifications to the access policy statement are made where appropriate. | Access rights encompasses accounts for network, operating system, and application access. ACLs, user and system accounts, etc. Automatic identification of terminals and portable devices. Timeout of remote systems left unattended for extended periods of time |
| IX.2 | User Access Management | System of formal registration/de-registration for access to IT services. Immediate account | No control over access to IT services. | An informal, undocumented user account practice is applied on an ad hoc basis. | A user account policy defining access rights, privilege levels, and creation/deletion rules exists and is published. | A specific party is responsible for defining and maintaining the user account policy. User account creation/deletion | The user account policy is periodically reviewed to conform to the changing needs of the business. Audit requirements are | Deletion vs. disabling accounts. Unique id for all users. |

TABLE 1-continued

Security Assessment Matrix

| ISO 17799 Categories | Item Definitions | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements | Scope Requirements |
|---|---|---|---|---|---|---|---|
| | removal for users who change duties or leave the company. User's privilege in overriding system/application restriction. Record kept of all privileges allocated. System routine to grant privilege to users. Access control to program source library | | | | records are archived. | reviewed and modifications to the user account policy are made where appropriate. Multiple accounts per individual are created or deleted through a single point of control. | |
| IX.3 User Responsibilities | Security of user password. User password confidentiality level | Passwords are not used. | An informal, undocumented password practice is applied on an ad hoc basis. | A published password policy defines password strength (e.g., length, inclusion of special characters), aging, and usage. | A specific party is responsible for defining and maintaining the password policy. Record of password histories is archived. | The password policy is periodically reviewed to conform to the changing needs of the business. Periodic audits (cracking) of passwords are performed to ensure compliance and exceptions are noted, documented, and corrective action is taken. | Limit the number of password attempt before the system locks out the user. Record and make user aware of unsuccessful logon attempts Enforcement of password rules |
| | Good-practice guidelines to users in ensuring good security. | No guidelines exist. | An informal, undocumented guidelines is provided to users on an ad hoc basis. | A good-practice guidelines statement is defined and incorporated into user training programs. | A specific party is responsible for defining and maintaining the good-practice guidelines. | A process exists to solicit suggestions for best-practice guidelines from internal and external sources and to incorporate them into the organization's user security guidelines. | No display of system identifiers until logon has been successful General notice warning that the system should only be used by authorized users |

TABLE 1-continued

Security Assessment Matrix

| | ISO 17799 Categories | Item Definitions | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements | Scope Requirements |
|---|---|---|---|---|---|---|---|---|
| | | | | | | | | If error occurs at logon do not indicate what the error was |
| | | Cryptographic Controls | No guidelines exist. | An informal, undocumented guidelines is provided to users on an ad hoc basis. | A good-practice guidelines statement is defined and incorporated into user training programs. The guidelines cover: encryption, digital signatures, key management, non-repudiation services | A specific party is responsible for defining and maintaining the good-practice guidelines. | A process exists to solicit suggestions for best-practice guidelines from internal and external sources and to incorporate them into the organization's user security guidelines. | |
| IX.4 | Network Access Control | Covered in other area in this section | | | | | | |
| IX.5 | Operating System Access Control | Covered in other area in this section | | | | | | |
| IX.6 | Application Access Control | Covered in other area in this section | | | | | | |
| IX.7 | Monitoring System Access and Use | Covered in other area in this section | | | | | | |
| IX.8 | Mobile Computing and Teleworking | Mobile Computing and Teleworking | No guidelines exist. | An informal, undocumented guidelines is provided to users on an ad hoc basis. | A good-practice guidelines statement is defined and incorporated into user training programs. | A specific party is responsible for defining and maintaining the good-practice guidelines. | A process exists to solicit suggestions for best-practice guidelines from internal and external sources and to incorporate them into the organization's user security guidelines. | Laptop, Mobile, and Palmtop security to ensure company information is not compromised. |
| X.1 | Security Requirements of Systems | Risk assessment and risk | There is no framework of risk | An informal undocumented risk | A published risk assessment and risk | A specific party is responsible for defining and | The risk assessment and risk management policies are | |

TABLE 1-continued

Security Assessment Matrix

| ISO 17799 Categories | Item Definitions | Level 1 (Initial) | Level 2 (Repeatable) Not written down, but communicated via coaching | Level 3 (Defined) Written down | Level 4 (Managed) | Level 5 (Optimizing) | Scope Requirements |
|---|---|---|---|---|---|---|---|
| | management used for analyzing security requirement | assessment. | assessment and risk management practice is applied on an ad-hoc basis. | management procedure exists. | Responsibility is defined maintaining the risk assessment and risk management guidelines. An archive is kept of the risks identified and the action taken to manage the risk. | Process exists for catching deviations and making constant improvements periodically reviewed to conform to the changing needs of the business. Changes are made to the policy where required. | |
| | Safety check while procuring new program and software | No safety checks are carried out when procuring new software. | An informal procedure exists whereby new programs and software are assessed before being put in to the operational environment. This task in performed on an ad-hoc basis. | There is a documented procedure that is followed before any software is purchased. This ensures that all software purchased conforms to company security guidelines. | A specific party is responsible for defining and maintaining the software safety check guidelines. Modifications to vendor supplied packages are made to comply with system requirements and vendor consent is obtained before doing so. | The safety checks are regularly reviewed to ensure that they conform to the changing needs of the business. There is a regular risk analysis is carried out to ensure safety of existing systems and compromise to their security is controlled. Emphasis is given on quality certification of new products. | |
| X.2 Security in Application Systems | Validation control while data input to application system Data validation of stored information Output Data Validation | There is no validation of information on application systems. | An informal process exists where data is both verified before it is entered in to applications and existing data is verified. Basic tests like missing or incomplete | There is a published standard which describes the validation tests that are performed. There is a documented process which is followed. | A specific party is responsible for defining and maintaining the validation control guidelines. | The validation control procedure is regularly reviewed to ensure that they conform to the changing needs of the business. Periodic audits are performed of data on application systems to ensure compliance. Exceptions are noted, documented and corrective action is | |

TABLE 1-continued

Security Assessment Matrix

| | ISO 17799 Categories | Item Definitions | Level 1 (Initial) | Level 2 (Repeatable) Not written down, but communicated via coaching | Level 3 (Defined) Written down | Level 4 (Managed) Responsibility is defined | Level 5 (Optimizing) | Scope Requirements |
|---|---|---|---|---|---|---|---|---|
| | | | | data, invalid characters in fields are performed on an ad-hoc basis. | | | Process exists for catching deviations and making constant improvements taken. | |
| X.3 | Cryptographic Controls | Cryptographic control | There are no cryptographic controls or existing system architecture does not support cryptography. | There is an informal practice employed whereby some files are encrypted. This is done at the user discretion and on an ad-hoc basis. | There is a documented procedure which defines the steps which outlines which document classifications need to be encrypted and the process to be followed to achieve this. | A specific party is responsible for defining and maintaining the cryptography control guidelines. Separate key management procedures are used for digital signatures and encryption. | The cryptographic controls are regularly reviewed to ensure that they conform to the changing needs of the business. Audits are carried regularly to ensure that information that should be encrypted is kept encrypted and that the encryption method used is adequate. | |
| | | Vulnerabilities of cryptographic keys. Key management system. Documentation of key management system (activation & de-activation date, certificate information) | There are no key management procedures. | There is a process in place where by suitable key management exists, based upon an informal set of standards, procedures and secure methods. | There is a documented key management system which defines the steps to be followed. This ensures that the type of algorithm and length of keys are considered to identify level of cryptographic protection | A specific party is responsible for defining and maintaining the key management system. Separate key management procedures are used for digital signatures and encryption. Cryptographic keys have defined activation and deactivation dates. All keys are protected against modification and destruction in | The key management system is regularly reviewed to ensure they conform to the changing needs of the business. Key management needs are reviewed and changes are made where necessary. Audits are carried out to ensure that the organization maintains a recognized certification authority to ensure key protection and efficient key management. | |

TABLE 1-continued

Security Assessment Matrix

| | ISO 17799 Categories | Item Definitions | Level Definitions | | | | | Scope Requirements |
|---|---|---|---|---|---|---|---|---|
| | | | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements | |
| X.4 | Security of System Files | Protection and control of system test data. Change control procedure Control of operational software | No change control procedure in place and no provisions for the protection of system test data. | An informal procedure exists for change control. This task is performed on an ad-hoc basis. | There is a documented standard available to employs describing the procedures to follow to ensure that the change control procedures are followed correctly | case of private key compromise. A specific party is responsible for defining and maintaining the change control guidelines. Version control for software update is maintained and archives are kept of all versions. | The change control policy is regularly reviewed to ensure that it conforms to the changing needs of the business. Version control logs are audited and any exceptions are documented, noted and corrective action is taken if necessary. | |
| X.5 | Security in Development and Support Processes | Awareness of software upgrade to enhance the security level | There is no process in place to monitor security risk posed by software installed on machines. Software upgrade does not take into account the security of the new releases | An informal procedure exists to monitor vendor web sites to obtain software updates. This task is performed on an ad-hoc basis. Security issues defined by the vendors are only considered. | There is a documented standard available to employees describing the procedures to follow to ensure that all software installed on their machines is of the latest version. All security issues with the new release specific to organizational system platform are identified and confirmed with the vendor. | A specific party is responsible for defining and maintaining the software update guidelines. An archive is kept of all software upgrades. Change control procedures and contractual agreements exist to escalate security issues to appropriate levels and remedy them. | The software update policy is regularly reviewed to ensure that it conforms to the changing needs of the business. Periodic audits are performed of software upgrades to ensure compliance. Exceptions are noted, documented and corrective action is taken if necessary. | The new software is put in a test environment to check for anomalies with security policies before implementation |
| XI.1 | Aspects of Business | Contents of Business | No plan. | There is some knowledge of | There is a written and | Employees are trained, and | Includes process for improvement | Risk analysis of critical business processes. |

TABLE 1-continued

Security Assessment Matrix

| ISO 17799 Categories | Item Definitions | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements | Scope Requirements |
|---|---|---|---|---|---|---|---|
| Continuity Management | Continuity Process Procedures and Schedules Included in the Process | | what to do in case of disaster (e.g., based on training or on prior experience) but no documented process. | properly distributed plan. Process includes: Fallback procedures Resumption procedures Maintenance schedules | training is periodically refreshed. Plan includes alternate communication methods if communication is severely affected. Process also includes: Assignment of responsibilities Conditions for activation | after each invocation. | Identifies events that can cause interruptions to business processes, and includes assessment of the impact of those interruptions. |
| | Development of Business Continuity Process Testing of Business Continuity Process Review and Update of Continuity Process Reasons that Cause Review of the Plan | Plan does not exist. Some awareness of measures that can be taken in case of a business interruption. Actions would occur in an ad hoc manner. | A set of measures can be applied in case of a business interruption. They do not constitute formal, defined, published, or managed plan. | There is a written business continuity process that includes risks, events, roles and responsibilities, technical measures, reporting, and communication. The plan has been tested at least once. | The management chain responsible for executing the business continuity process is define, and all managers and staff know what the chain is. Testing occurs at least annually and maintains the business continuity process. | The process is reviewed in case of change in system, staff disaster recovery contractor or contract, business, application, locations, or legislation. Post-mortem reviews after execution with documented improvement actions. | Business continuity process covers events that are specific to the local environment (i.e., flood, power outage, political unrest, fire, hurricane, earthquakes, etc.) and business needs (i.e., credit card center cannot be down more than a few minutes) |
| XII.1 Compliance with Legal Requirements | Restrictions in Place on the Use of Materials for Which There May Be Intellectual | No restrictions in place. | Ad hoc restriction on some documents only. | Systematic restrictions, documented, based on the information classification | Clear responsibility to enforce the restrictions. Training is provided. Employees are | Periodic review of the policy for continuing improvement. Periodic review of the restrictions to | Copyright policy Acquisition procedures Copyright awareness information Maintenance of licenses Check on software held/used |

TABLE 1-continued

Security Assessment Matrix

| ISO 17799 Categories | Item Definitions | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements | Scope Requirements |
|---|---|---|---|---|---|---|---|
| | Property Rights | | | | aware. | make sure they're appropriate. | Policy on software disposal Compliance with licenses Personnel information Copyright information Company confidential information Public web sites |
| | Safeguards against loss, destruction or falsification of organizational records | No safeguards employed. No defined hierarchy as to whom has access to what information. | Some organizational data backed up and secured. Backups may be kept onsite. No logs kept of user activity. | Clear responsibilities to ensure that organization records are not compromised. Some user activity is logged. Organizational data is kept securely. Documents are publicly available that describe the policy and procedures that employees should follow to maintain integrity and safety of organizational records. | Safeguards in place covering all organizational records. Training provided to educate users. Management responsibly to ensure that records are kept accurate and secure. Access rights and privileges in place to restrict access to certain organizational records. Web sites protected from defacement. Critical files identified and protected against falsification by CRC checks, etc | Periodic review of systems in place and security of systems that deal with organizational records. Each incident is subject to a post mortem procedure that includes a review of whether applicable policies were correctly communicated. Users are taught the incident reporting procedures. Full audit logs maintained with system start/finish times, system errors and corrective action and name of person making alterations to the information. | |
| | Compliance with data protection | Knowledge of legislation | Data protection legislation is | Legislation is applied and Data protection | Processes and procedures are put in place | There is a regular process in place to | |

TABLE 1-continued

Security Assessment Matrix

| ISO 17799 Categories | Item Definitions | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements | Scope Requirements |
|---|---|---|---|---|---|---|---|
| | legislation | is limited to specific people or departments (HR, Legal, etc.) and is not documented. | discussed with employees and contract or temporary personnel upon hiring into specific departments. | legislation is made available to employees in a centralized location. Impact of legislation and concerned data has been written up and made available to employees. All affected processes include appropriate protection steps. | for monitoring to ensure that the company is continually compliant. The responsibility to do so is clearly assigned. | review changes in legislation, or new needs of the business. Training is provided to users to ensure the continued compliance with legislation. The process and responsibility to receive, investigate and correct any reported exception is defined. | |
| | Compliance of information systems with published standards or codes of practice | No published codes of practice and no awareness | Standards and codes of practice are generally understood but are applied inconsistently through the organization. | Standards and codes of practice are defined and published internally and are made available to employees in a centralized location. | A clearly designated person or body has responsibility for the reviewing, maintaining, and training users on the published standards or codes of practice. | There is a regular process in place to review changes in published standards or codes of practice. Findings of non-compliance result in corrective action. | Intellectual Property Rights Copyright Data Protection Act |
| XII.2 Reviews of Security Policy and Technical Compliance | Documentation of regulatory and contractual requirements for each information system | No documentation exists. | Some documentation exists although it does not cover all details of regulatory/ contractual requirements for each IS. There is no | Documents are made publicly available on the corporate web site or on a public notice board. Full documentation exists for contractual and regulatory | Responsibilities are assigned to individuals to produce documents as soon as a new system is sourced. Templates exist for the creation of documents | Documents are created as soon as there is a change in the contractual or regulatory requirements of the project. Documentation is available to personnel with correct clearance. | Laws on protection and/or correction of personal information (employees and/or clients, suppliers, etc.) Procedures for disclosure to proper authorities. ISO 9000 requirements |

TABLE 1-continued

Security Assessment Matrix

| | ISO 17799 Categories | Item Definitions | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements | Scope Requirements |
|---|---|---|---|---|---|---|---|---|
| | | | | standard document template used, documents are created as and when required by individual employees. There is no central data store for the documents (need to ask people who know). | requirements for all information systems in the organization. | and there is a central repository where they are stored. The templates have designated owners. | Periodic inventory of information systems includes checks that compliance requirements exist. Exceptions trigger a well-defined process to review procedures in order to eliminate this risk. | Regulatory agencies (e.g., FDA or FCC in the United States) |
| XII.3 | System Audit Considerations | Control Against Computer Misuse Safeguard of Audit Tools to Prevent Misuse | No controls or safeguards in place | Terms of use of computer equipment are discussed with employees and contract or temporary personnel upon hiring. | Terms of use of organizations computer equipment are available from a centralized location (Intranet site, office notice boards, etc) | The responsibility of managers is defined. Tools employed to monitor usage of computer equipment. Staff has well defined roles and access rights to computer file systems. Personnel are made aware that their computer related activities are being monitored, and to what extent. | Periodic reviews of who is authorized to do what. Information gathered from monitoring tools is used to make decisions for future policy. There is an incident review procedure. Periodic "white hat" intrusion attempts are made and followed by corrective actions. | |
| | | Review/Audit of information systems to ensure they are in compliance with security | No process is in place | Occasionally reviewed or audited if senior management, auditors, etc., | Reviewed at intervals, but no clear management responsibility to trigger reviews | A clearly designated person or body has responsibility for the process, and | There is a defined mechanism to review and upgrade the policy after every security incident (Is | |

TABLE 1-continued

Security Assessment Matrix

| ISO 17799 Categories | Item Definitions | Level 1 (Initial) | Level 2 (Repeatable) Not written down, but communicated via coaching | Level 3 (Defined) Written down | Level 4 (Managed) Responsibility is defined | Level 5 (Optimizing) Process exists for catching deviations and making constant improvements | Scope Requirements |
|---|---|---|---|---|---|---|---|
| | policies and standards | | ask | of exploit results | reviews it regularly. | anything missing from the policy that could have prevented the problem?) | |
| | Coverage of System Regime (event logging) | No coverage exists. | Few safeguards in place. Audit tools are not managed securely and user access is not monitored. | Clear responsibilities to ensure that audit tools are not misused. Training provided to educate users. | Audit tools are only available for use by key personnel. Access rights and privileges are enforced to maintain security. | Safeguards in place covering all audit tools. Periodic review of systems and security of systems that audit systems. Users are educated on the importance of safeguarding their audit tools. | |
| | Compliance of information systems with published standards or codes of practice | No published codes of practice and no awareness | Standards and codes of practice are generally understood but are applied inconsistently through the organization. | Standards and codes of practice are defined and published internally and are made available to employees in a centralized location. | A clearly designated person or body has responsibility for the reviewing, maintaining, and training users on the published standards or codes of practice. | There is a regular process in place to review changes in published standards or codes of practice. Findings of non-compliance result in corrective action. | Intellectual Property Rights Copyright Data Protection Act |

Referring to the Security Assessment Matrix shown in Table 1, to perform the assessment for a given item, the assessment entity need only perform the following steps: (i) find the item in question, first by category then by sub-category; (ii) read the descriptions under each maturity level and determine if requirements of that maturity level are met; and (iii) record the highest maturity level for that item that is met by the organization's current information security policies and practices.

Once the preliminary rating has been completed, it may be displayed in a graphical manner. In one embodiment of the invention, the preliminary rating is displayed using a Security Maturity Assessment Reporting Tool (SMART). SMART allows the preliminary rating to be shown at a detailed level, i.e., all 61 elements are shown, or at a summary level, i.e., only 10 broad categories are shown. Further, SMART allows the organization to compare the preliminary rating to a predefined goal, an industry average, or to a prior assessment. Additionally, the layout of the SMART report allows an organization to readily identify areas that require improvement.

Figure 3:
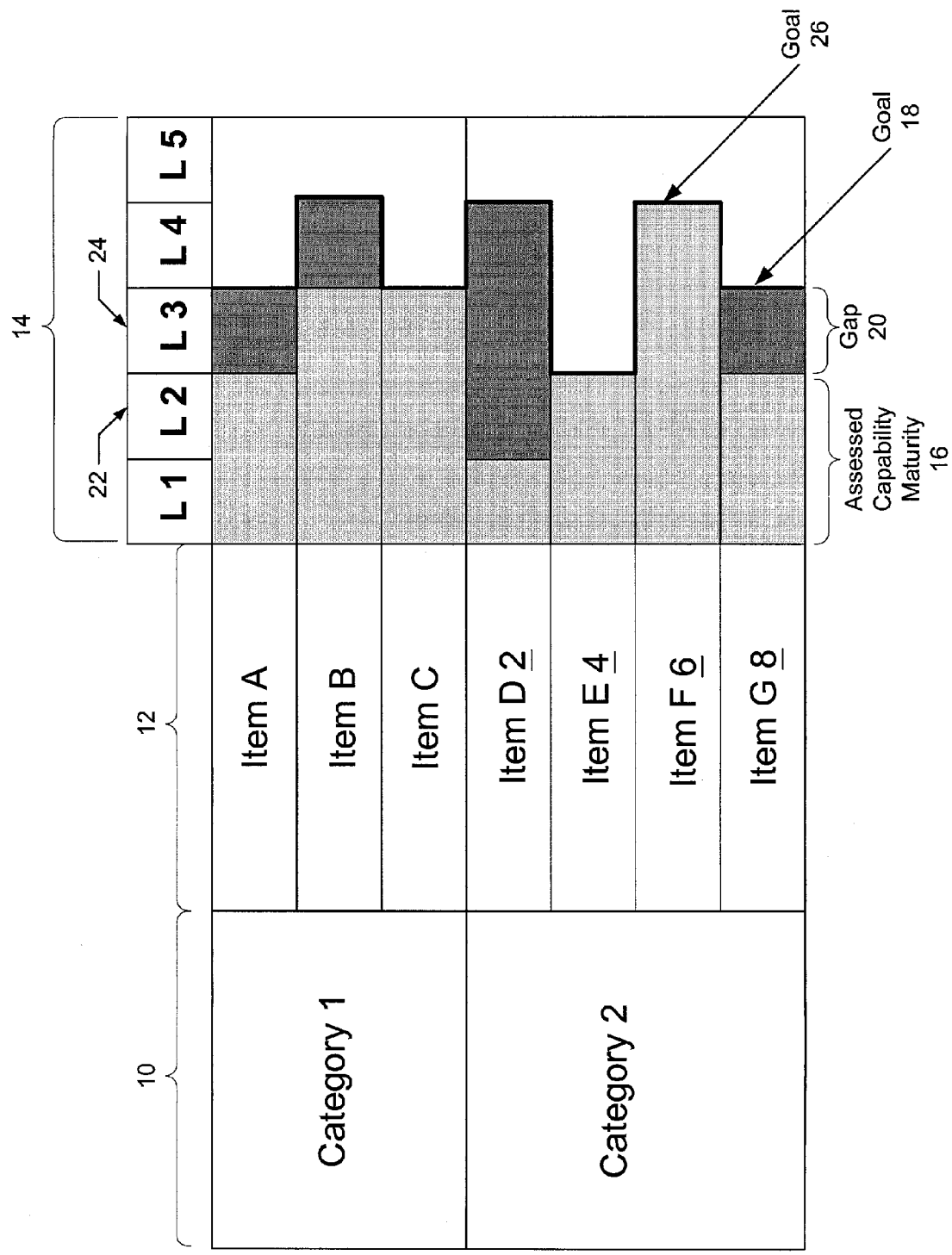
FIG. 3 illustrates a portion of a Security Maturity Assessment Reporting Tool report in accordance with one or more embodiments of the invention.

FIG. 3 illustrates a portion of a SMART report in accordance with one or more embodiments of the invention. A first column (10) lists the broad categories. A second column (12) lists the items within each of the categories.

A third column (14) graphically represents the "assessed capability maturity" (ACM) (16). The third column is subdivided into five levels (L1, L2, L3, L4, and L5) corresponding to the maturity levels listed above. For each item, the ACM is represented by shading the corresponding row up to the appropriate level. If the ACM is not at a goal (18), i.e., the level at which the organization wishes to be for the particular item, then an additional shading representing a gap (20) between the goal (18) and the ACM (16) is present.

For example, in FIG. 3, Category 2 contains four items: Item D (2), Item E (4), Item F (6), and Item G (8). Specifically, looking at Item G (8), the ACM (16) is at level 2 (22), while the goal (18) is at level 3 (24). Thus, a gap (20) is present between level 2 (22) and level 3 (24) on the row containing Item G (8). Thus, the organization can readily see that Item G (8) is below the goal (18). By contrast, the organization can also readily see that capability maturity level for Item F (6) is at the goal (26) set for this item, so there is no gap relative to Item F (6).

Returning back to the SMA phase, once the preliminary rating has been completed, the assessment entity reviews the preliminary rating with the organization. During the review, the preliminary rating may be revised, if necessary. Once this has been completed, a final rating is generated.

During the corrective action plan (CAP) phase, the CAP is generated using the final rating and the Security Assessment Matrix. The proposed actions are aimed at improving the items that have gaps and bringing the items Up to the goal. Additionally, items in the CAP may also be prioritized according to the needs and resources of the organization. During the corrective action plan execution phase, the CAP is executed. For example, if the SAM states that for a certain item to be at Level 3, "the policy is written down," and to be at Level 4, "there is an assigned manager in charge of applying this policy," then it follows that if an organization is assessed at Level 3 for this item, and its goal is to be at Level 4, then the CAP should include the following action: "Put a manager in charge of this policy."

The monitoring phase of the SMA includes periodic SMART reports to ensure that goals are met and maintained. Further, during this phase, the assessment entity may detect change in the environment that might require additions or changes to the security practices and/or policies. Additionally, during the monitoring phase, the assessment entity may provide assistance for debriefing the organization in the event of an information security incident. In one or more embodiments of the invention, the monitoring phase is optional.

Figure 4:
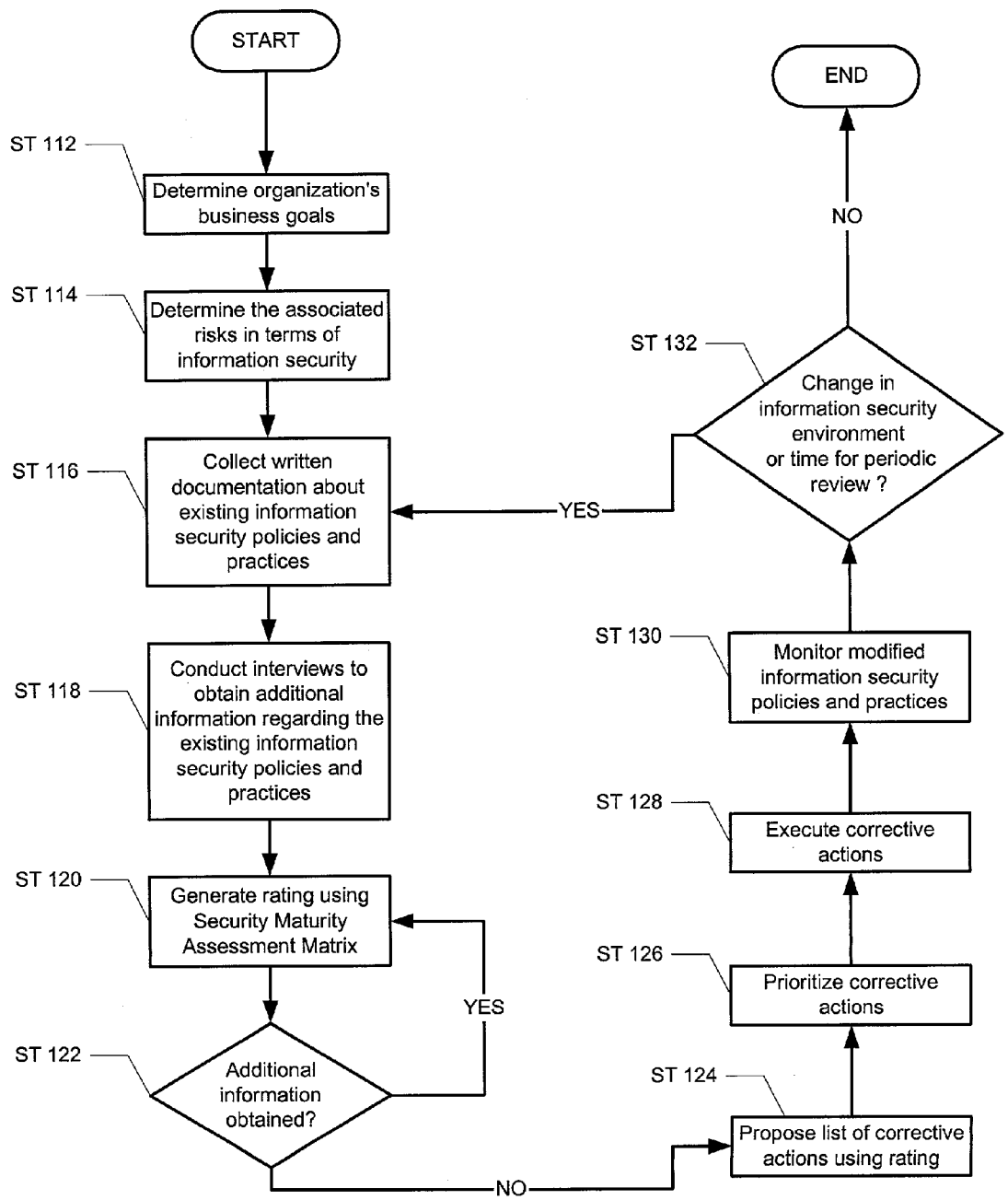
FIG. 4 illustrates a flowchart detailing the Security Maturity Assessment method in accordance with another embodiment of the invention.

FIG. 4 illustrates a flowchart detailing the SMA method in accordance with another embodiment of the invention. Initially, the organization's business goals are determined (Step 112), as well as the associated risk in terms of information security (Step 114). Written documentation is then collected about the organization's existing information security policies and practices (Step 116). Additional information is then collected via interviews (Step 118). Using the information gathered in Steps 112 through 118, the SAM rating is generated (Step 120). If additional information is obtained (Step 122), then step 120 may be repeated. If no additional information is obtained (Step 122), then a list of corrective actions is proposed (Step 124). The corrective actions are subsequently prioritized (Step 126) and executed (Step 128) to generate modified information security policies and procedures. The modified information security policies and procedures are then monitored (Step 130). If there is a change in the information security environment, e.g., a first organization merges with a second organization resulting in the first organization's network being integrated into the second organization's network, or if the time for a periodic review arrives (Step 132), then the process proceeds back to Step 116.

The invention, in one or more embodiments, may have one or more of the following advantages. The SMA method is a systematic approach that includes a process, a detailed method for assessment (i.e., SAM), and a reporting tool (i.e., SMART). Further, the SMA method covers all aspects of information security and explicitly defines what each level means for each item. Further, the SMA method is action oriented. Further, each item is assessed as a capability maturity rather than pass/fail, allowing an organization to readily gauge where the organization is with respect to a particular information security item and to measure progress over time or against a goal, even if that progress is gradual. Additionally, the security assessment matrix may be used as a list of recommendations to detail how the organization may attain its information security goals.

Further, the SMA method is easy to apply, as each item and corresponding set of criteria for each maturity level associated with the item are clearly defined. Further, the SMA method is flexible, as it may be used for multiple purposes. For example, the SMA may be used for the purpose of establishing to a customer or regulatory authority that an organization has the required capability to perform a certain task. The SMA may also be used for the purpose of internally monitoring, over time, improvements decided by the organization's management. The SMA may also be used for the purpose of meeting a certain industry standard or reaching a goal established through analysis of the competition's security capabilities.

Further, the invention produces an objective rating of an organization's information security practices and policies removing the subjective element of the assessment process.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for assessing an information security policy and practice of an organization, comprising:
   collecting information about the information security policy and practice of the organization;
   generating a rating for each of a plurality of information security items using a security maturity assessment matrix and the collected information,
      wherein the security maturity assessment matrix comprises a first dimension and a second dimension,
      wherein the first dimension corresponds to the plurality of information security items;
      wherein the second dimension corresponds to a plurality of maturity levels;
      wherein at least one of the plurality of maturity levels corresponds to a maturity level associated with a Capability Maturity Model, and
      wherein each rating is derived using the first dimension and the second dimension; and
   determining how to modify the information security policy and practice of the organization using the rating for the at least one of the plurality of security items.

2. The method of claim 1, further comprising:
   generating a new rating for each of a plurality of information security items using the security maturity assessment matrix when there is a change in an information security environment of the organization.

3. The method of claim 1, further comprising:
   generating a graphical assessment of the ratings.

4. The method of claim 3, wherein the graphical assessment of the ratings is generated by a security maturity assessment reporting tool.

5. The method of claim 4, wherein the security maturity assessment reporting tool comprises functionality to track the ratings of each of the plurality of information security items over time.

6. The method of claim 4, wherein the security maturity assessment reporting tool comprises functionality to graphically compare the ratings associated with each of the plurality of information security items with a corresponding rating goal associated with each of the plurality of information security items.

7. The method of claim 1, the collecting information comprising collection of documentation detailing the information security policy and practice of the organization.

8. The method of claim 1, wherein at least one of the plurality of information security items corresponds to a best mode practice in information security.

9. The method of claim 1, wherein determining how to modify the information security policy and practice of the organization, comprises:
   generating a corrective action using the rating for at least one of the plurality of information security items and the security maturity assessment matrix.

10. The method of claim 9, further comprising:
    executing the corrective action to create a new security information policy and practice.

11. The method of claim 10, further comprising:
    monitoring the new security information policy and practice.

12. The method of claim 9, wherein generating the corrective action comprises:
    obtaining a first description from the security maturity assessment matrix corresponding to the rating of the at least one of the plurality of information security items;
    obtaining a second description from the security maturity assessment matrix corresponding to a goal rating of the at least one of the plurality of information security items; and
    comparing the first description with the second description to obtain the corrective action for the at least one of the plurality of information security items.

13. The method of claim 1, wherein at least one of the plurality of security items corresponds to an information security item associated with at least one selected from the group consisting of BS7799 and ISO17799.

14. The method of claim 1, wherein the maturity level is at least one selected from the group consisting of: initial, repeatable, defined, managed, and optimized.

15. The method of claim 1, wherein at least one of the plurality of information security items in the first dimension is associated with a scope requirement.

16. The method of claim 15, wherein the scope requirement defines what portions of the organization to which the at least one of the plurality of information security items applies.

17. The method of claim 1, wherein the first dimension is displayed using at least one row and the second dimension is displayed using at least one column.

18. An apparatus for assessing an information security policy and practice of an organization, comprising:
    means for collecting information about the information security policy and practice of the organization;
    means for generating a rating for each of a plurality of information security items using a security maturity assessment matrix and the collected information,
       wherein the security maturity assessment matrix comprises a first dimension and a second dimension,
       wherein the first dimension corresponds to the plurality of information security items;
       wherein the second dimension corresponds to a plurality of maturity levels;
       wherein at least one of the plurality of maturity levels corresponds to a maturity level associated with a Capability Maturity Model, and
       wherein each rating is derived using the first dimension and the second dimension; and
    means for determining how to modify the information security policy and practice of the organization using the rating for the at least one of the plurality of security items.

19. The apparatus of claim 18, further comprising:
    means for generating a new rating for each of a plurality of information security items using the security maturity assessment matrix if there is a change in the information security environment of the organization.

20. The apparatus of claim 18, wherein determining how to modify the information security policy and practice of the organization, comprises:
    means for generating a corrective action using the rating for at least one of the plurality of information security items and the security maturity assessment matrix.

21. The apparatus of claim 20, further comprising:
    means for executing the corrective action to create a new security information policy and practice.

22. The apparatus of claim 21, further comprising:
    means for monitoring the new security information policy and practice.

23. The apparatus of claim 21, wherein the scope requirement defines what portions of the organization to which the at least one of the plurality of information security items applies.

24. The apparatus of claim 18, wherein at least one of the plurality of security items corresponds to an information security item associated with at least one selected from the group consisting of BS7799 and ISO17799.

25. The apparatus of claim 18, wherein the maturity level is at least one selected from the group consisting of: initial, repeatable, defined, managed, and optimized.

26. The apparatus of claim 18, wherein at least one of the plurality of information security items in the first dimension is associated with a scope requirement.

27. A computer system for assessing an information security policy and practice of an organization, comprising:
a processor;
a memory;
an input means; and
software instructions stored in the memory for enabling the computer system under control of the processor, to perform:
collecting information about the information security policy and practice of the organization;
generating a rating for each of a plurality of information security items using a security maturity assessment matrix and the collected information,
wherein the security maturity assessment matrix comprises a first dimension and a second dimension,
wherein the first dimension corresponds to the plurality of information security items;
wherein the second dimension corresponds to a plurality of maturity levels;
wherein at least one of the plurality of maturity levels corresponds to a maturity level associated with a Capability Maturity Model, and
wherein each rating is derived using the first dimension and the second dimension;
determining how to modify the information security policy and practice of the organization using the rating for the at least one of the plurality of security items.

28. The computer system of claim 27, further comprising:
software instructions to perform generating a new rating for each of a plurality of information security items using the security maturity assessment matrix if there is a change in the information security environment of the organization.

29. The computer system of claim 18, wherein software instructions for determining how to modify the information security policy and practice of the organization, comprises:
software instructions for generating a corrective action using the rating for at least one of the plurality of information security items and the security maturity assessment matrix.

30. The computer system of claim 29, further comprising:
software instructions for executing the corrective action to create a new security information policy and practice.

31. The computer system of claim 30, further comprising:
software instructions for monitoring the new security information policy and practice.

32. The computer system of claim 27, wherein at least one of the plurality of security items corresponds to an information security item associated with at least one selected from the group consisting of BS7799 and ISO17799.

33. The computer system of claim 27, wherein the maturity level is at least one selected from the group consisting of: initial, repeatable, defined, managed, and optimized.

34. The computer system of claim 27, wherein at least one of the plurality of information security items in the first dimension is associated with a scope requirement.

35. The computer system of claim 34, wherein the scope requirement defines what portions of the organization to which the at least one of the plurality of information security items applies.

* * * * *